United States Patent Office 3,409,497
Patented Nov. 5, 1968

3,409,497
ADHESIVE SHEET MATERIALS AND METHOD
OF MAKING THE SAME
Luther M. Roseland, Seal Beach, Calif., assignor to Minnesota Mining and Manufacturing Company, St. Paul, Minn., a corporation of Delaware
No Drawing. Continuation-in-part of abandoned application Ser. No. 201,243, June 11, 1962. This application Feb. 21, 1963, Ser. No. 260,328
8 Claims. (Cl. 161—184)

ABSTRACT OF THE DISCLOSURE

A self-sustaining thermosettable adhesive sheet material consisting of a web of fibers having latently reactive sites and a non-fibrous organic resin reactive with the latently reactive sites at specified temperatures and methods of making said sheet materials are provided.

This application is a continuation-in-part of my application Ser. No. 201,243, filed June 11, 1962, now abandoned.

I have discovered that thermoset reaction products can be provided in new and useful forms with improved structural strength, when formed from polyreactive organic components, at least one of which is a latently reactive thermoplastic ploymer in fiber form prior to thermosetting.

In the past, thermosetting materials to make adhesives, films, shells and more massive molded articles have been supplied in such forms as powders, films, liquid, or as saturants, impregnants or coatings or inert carriers. Reinforcing of the thermoset product has been achieved by the simple addition thereto of inert, staple length fibers, clay particles, carbon black, and other inert fillers. In more massive articles, e.g. rubber tire tread, radomes, reinforced plastic pipe, etc., reinforcing fibers in the form of continuous filaments are often used.

In the field of industrial structural adhesives, a field with which this invention is particularly concerned, the addition of reinforcing agents is not always desirable in the bonding of metal and other parts to one another with thermoset adhesives since they do not contribute any adhesive function, and in fact decrease the effective area of adhesion of the adhesive to the parts to be adhered. In instances where inert fibers are normally used to reinforce a thermoset plastic, weight is added to the plastic by the fibers. The fibers may be in the form of a nonwoven web, bat, scrim cloth or the like, and is highly advantageous as an adhesive carrier since it eliminates solvent problems, and facilitates and simplifies adhesive manufacture to specific weights, thicknesses, etc.

This invention provides thermosetting reactants in a form such that reinforcing properties are contributed to the resultant thermoset reaction product by one, or more, of the reactants, thereby maintaining the advantages of adhesive carrier webs while contributing added strength without added weight, or the same strength with less weight, than the same thermosetting reactants reacted from some other form. These are factors of tremendous importance in the formation of structural adhesives and molded plastic components for use in industries such as the aircraft industry, where maximum strength per unit of weight is of paramount importance.

In accordance with this invention a thermoset reaction product having improved properties is made by reacting (1) a plurality of contiguous thermoplastic polymer fibers having further reactive sites with (2) an organic material capable of cross-linking with said polymer fibers in a temperature range above the melting temperature of the polymer fibers and below the decomposition temperature of any of the reactants or reaction products, the reaction being carried out by maintaining (1) and (2) in reactive contact with one another while heating them to a temperature at which said melting fibers and organic material form said thermoset reaction product, and maintaining this reaction temperature until the thermosetting reaction is substantially complete.

When thermosetting reactants are combined in this fashion the resulting thermoset product has been found to take on the reinforcing properties of fibers without addition of inert fiber weight or lessening of adhesion properties which are normally encountered with fiber reinforcement. The thermoplastic fibers form one of the thermosetting reactants and apparently as the fibers melt, they are at the same time reacting to form the thermoset reaction product. Thus, as melting of the fibers progresses so does the thermosetting reaction; this results in an apparent retention of vestigial fiber reinforcing properties in the thermoset product by thermosetting the fibers before they melt to a totally amorphous state. The appearance of the resulting product can vary superficially from a homogeneous appearing thermoset product to a heterogeneous visibly fiber reinforced product. But, upon close inspection (e.g. low power microscope) fibrous remnants are readily observed even in the homogeneous appearing products.

It has been found that thermosetting adhesives prepared in this manner, once thermoset, possess surprisingly greater strength than do thermoset adhesives formed from the same reactants in different physical forms, e.g., liquid, film, etc. prior to thermosetting. Thus, all the advantages of a carrier web are maintained while the disadvantages are avoided.

The thermoplastic ploymers useful in the practice of this invention are those which can be formed into fibers, which have reactive sites for cross-linking, and, preferably, those which are highly crystalline, e.g. more than about 40% of the polymer chains being linearly aligned in the natural room temperature state of the polymer, and, after fiber formation, capable of further orientation by stretching. While highly crystalline oriented thermoplastic fibers are preferred, any high molecular weight thermoplastic polymer capable of undergoing some stretch orientation upon formation into a fiber may be used and some advantage over cast films, liquid polyreactants, etc. gained thereby. The reactive sites on the polymers may be in the form of functional groups such as carbyonyls, amidos, aminos, hydroxyls, carboxyls, oxirane oxygens, etc., as well as sites of unsaturation such as ethylenic double bonds and the like.

Examples of reactive fiber forming thermoplastic polymers useful in the practice of this invention are cellulose acetate; vinyl chloride-vinyl acetate copolymers; copolymers of acrylonitrile with vinyl acetate, vinyl pyrollidone and the like; polymers of bisphenol A and epichlorohydrin; polyamides (nylons), such as polycaprolactam, poly-hexamethylene adipamide, polyhexamethylene sebacamide, etc., and copolymers and blends of these polyamides; the polyamide of 11-aminoundecanoic acid, poly-pyrollidone polymers; segmented (blocked) copolymers of polyesters such as polyethylene terephthalate with polyamides, polyurethanes formed by chain extension of crystalline polyesters with polyisocyanates; and polyether-polyurethane block copolymers.

A preferred group of reactive thermoplastic polymer fibers are those formed from lower alcohol (methanol and ethanol) soluble hydrophilic polyamide polymers (nylons at least about 5% soluble in alcohol at room temperature) which melt at temperatures well below about 350° F. A specific polyamide polymer of this type is the interpolyamide formed from the condensation products of hexamethylene diamine with sebacic and adipic acids, and epsilon-caprolactam. This interpolyamide polymer is commercially available from duPont under the tradename "Zytel 61" and has a Fisher-Johns melting point of 292° F. and a specific gravity of 1.12. It is soluble in ethyl as well as methyl alcohol and in some aqueous solutions of these alcohols at approximately 80 parts alcohol to 20 parts water. Oriented fibers of this polymer can be readily drawn using melt spinning techniques well known in the art. While such fibers are not desirable for use in textile applications they are admirably suited to the present invention by virtue of their reactivity with epoxy resins coupled with their low melting hydrophilic characteristics.

For reaction with the fibers, organic materials which are reactive to cross-link with the thermoplastic polymer fibers at temperatures at and above the melting temperature of the thermoplastic polymer and below the decomposition temperature of the resulting thermoset product, or any of the reactants in the formation of the product, may be used. These organic materials may be in themselves thermosetting and may include more than one reactant e.g., an epoxy compound and a curing agent for the epoxy. This cross-linking reactant should of course be selected to be reactive with the particular thermoplastic polymer fiber or fibers chosen as the thermoplastic coreactant. The cross-linning coreactant may be an epoxy (1,2-oxirane) compound, a polyisocyanate compound, polyalcohol or other material.

Preferred reactive compositions are those wherein the thermoplastic polymer is in the form of a nylon fiber such as the "Zytel 61" nylon noted previously and a cross-linking epoxy composition, preferably with a further curing agent for the epoxy. Typical epoxy compounds are the glycidyl ether of bisphenol A; N,N-ortho-tris glycidyl ether of p-hydroxyaniline; poly-glycidyl ethers of novolak resin; dicyclopentene dioxide; tetrakis glycidyl ether of 1,1,2,2,-tetra phenyl ethane.

The present invention is of great significance in the structural adhesive field and following the teachings of this invention light-weight porous and nonporous fibrous adhesive sheeting may be used to provide suprisingly strong thermoset bonds having minimal quantity of adhesive material. Characteristically, these preferred sheets of poly-reactant materials are so porous that air freely flows through them. In effect they appear on superficial examination to be an open web of fibers and in the preferred form, the porous fibrous sheeting materials of this invention are characterized as being nonwoven randomly-oriented webs of either oriented or unoriented fibers, or longer filaments, having specified properties.

While bonds between parts are readily achieved using dense adhesive sheets heretofore known, greater quantities of adhesive are sometimes required than is desirable. This becomes particularly evident where surfaces to be joined are rough or irregular. Shaping of films to irregularly contoured surfaces is difficult; further, the compressibility of cast films or the like is very low and such films do not lend themselves readily to bonding between irregular or rough surfaces where minimal quantity of adhesive is desired together with high strength of bond and effective practical continuity of bond. The reactive thermoplastic polymer fibrous webs of this invention, wherein the coreactants or coreactants for the thermoplastic polymer fibers are carried as coatings on the fibers, as saturants for the web, as fiber impregnants, or in other fiber contacting form provide surprisingly strong bonds of practical continuity between parts, such as light-weight metal sheeting, with minimum quantities of adhesive material. By placing the adhesive material in the form of a porous web, it can be readily smoothed to compound curvatures and other contoured shapes. Also, the compressibility of the web adapts it to readily interfit between rough or irregular surfaces without excess adhesive in one spot and adhesive starved areas in other spots while still providing higher adhesive strength per unit weight of adhesive than the same adhesive applied in other forms.

Of course, reinforcing agents, in addition to the reactive fibers, inert fillers, color stabilizers, antioxidants, fire retardants, and other additives known to the art can also be incorporated into the fibrous webs to add to the life, stability, strength, or other properties of the thermoset reaction product without departing from the invention.

In reacting the fibrous web to form a thermoset reaction product, either as a structural adhesive or as a molded part or the like, it is preferred that the thermoplastic polymer be in stoichiometric excess, e.g., 1.1 to 15:1, and that the heat rise to the reaction temperature desired proceed with sufficient rapidity to produce the desired reaction. The optimum temperature can be readily empirically determined for each reactive system. However, in general the temperature rise should be greater than about 2° F. per minute from room temperature to reaction temperature. It may be, and preferably is, much higher if desired; and, some beneficial results are achieved even when it's lower. However, when the temperature rise is less than about 2° F. per minute the benefits provided by the invention are generally greatly decreased. Consequently, by "sufficient temperature rise" and similar terms as used herein is meant a temperature rise as on the order of at least about 2° F. per minute from room temperature. As a practical consideration, rapid heat rises to thermosetting temperatures are generally preferred since the thermoset reaction product formation time is thereby decreased; a heat rise of 15° F. per minute to a thermosetting temperature of about 350° F. can readily be provided with commonly available heat sources.

As a percentage of the total weight of coreactants, the thermoplastic polymer should generally constitute from about 20% to about 90%, but over 60% is generally preferred. Some of the benefits of this invention may be retained outside these percentage ranges by proper selection of coreactants. For each reactive thermosetting system, the optimum ratio of coreactants to one another can be readily empirically determined by measuring the mechanical strength of thermoset products formed with varying ratios, e.g., comparing overlap shear, peel strength and/or honeycomb shear measurements in the case of thermoset adhesive reaction products.

Specific examples illustrative of some of the principles of this invention are given hereafter. Where the term "birefringence value" or the like is used, it refers to the refractive index of the axial length of fiber from which has been subtracted the refractive index of the cross-section of the fiber. A positive birefringence value (greater than zero) is indicative of axial orientation of the fiber.

Example 1

This example relates to a porous thermosettable sheet material comprising the following reactants:

| | Parts |
|---|---|
| Bisphenol A-epichlorohydrin, high molecular weight substantially linear copolymer ("Phenoxy 8") reactive hydroxyl groups | 20.0 |
| "ERLA 0500" epoxy resin | 4.1 |
| "ERLA 2774" epoxy resin | 4.1 |
| Dicyandiamide | 0.4 |

A porous thermosettable sheet material results when the "Phenoxy 8" above is employed in the form of a fibrous web, and the individual fibers are at least partially coated (but the web not flooded) with the remaining ingredients above. Moreover, the resultant thermosettable porous sheet material provides a higher strength thermoset bond than does the identical adhesive composition employed as a homogeneous one-phase mixture. Further, the use of axially oriented fibers of "Phenoxy 8" (said axial orientation indicated by a positive birefringence value) in combination with the other ingredients above, as to be described, provides a thermoset bond having exceptionally high strength at temperatures exceeding 250° F. For non-porous sheeting of the invention, the basic fibrous web is submerged in a film coating of the other ingredients above. Such structures also characteristically have a reactable fibrous base, but in the formation of adhesives are less preferred as compared to the porous structures hereof.

The hydroxyl terminated bisphenol A-epichlorohydrin copolymer ("Phenoxy 8") is a thermoplastic resin reputed to be composed of the following recurring structural units:

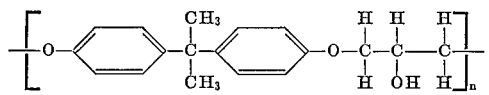

"Phenoxy 8" is commercially available as PRDA 8030N extrusion grade resin. As thus obtained, it has a specific gravity of 1.18, a glass transition temperature of 100° C., and an average molecular weight within the range of 20,000–30,000. It is reactable with epoxy resins in a manner analogous to the reactability of other active hydrogen compounds with epoxy resins.

Twenty-six denier unoriented filaments having a birefrigence value of 0.0011 are drawn from the extrusion grade bisphenol A-epichlorohydrin copolymer utilizing techniques well known in the art. The unoriented filaments are chopped into 1½" fibers, which in turn are randomly deposited into a non-woven fibrous web by means of a "Rando-Webber" felting machine (sold by Curlator Corp., Rochester, N.Y.). The randomly interlaced fibers provide a non-woven fibrous web having a basis weight of 0.032 lb. per sq. ft. and a caliper of approximately 30 mils.

The remaining ingredients above are dissolved in dioxane solvent to provide the following "Solution A":

| | Parts |
|---|---|
| 1,4 dioxane | 82.0 |
| "ERLA 0500" epoxy resin | 9.0 |
| Dicyandiamide | 0.9 |
| "ERLA 2774" exopy resin | 9.0 |

"ERLA 2774" epoxy resin is a reaction product of one mol bisphenol A with two mols epichlorohydrin, and may be represented by the following formula:

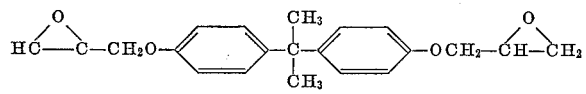

It has a Gardner-Holt viscosity of 13,000–14,000 seconds at 77° F., a specific gravity of 1.15–1.17, and an epoxy equivalency of 185–200 grams/gram mol.

"ERLA 0500" epoxy resin is a tertiary amine liquid resin that may be represented by the following formula:

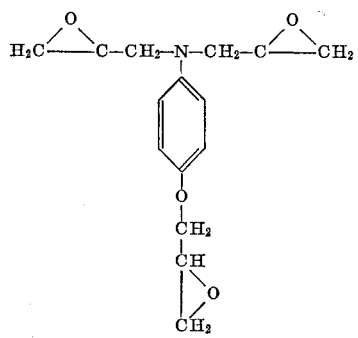

It has a Gardner-Holt viscosity of 2,000–4,000 seconds and an epoxy equivalency of 100–125 grams/gram mol.

Dicyandiamide serves as a cross-linking agent for the epoxy resin. Its structural formula is as follows:

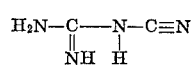

The non-woven fibrous web is impregnated with "Solution A"; the dioxane solvent is evaporated to provide a one-phase coating about the individual fibers of the web.

The resultant self-sustaining porous thermosettable sheet material has a basis weight of 0.045 lb./sq. ft.; weight ratio of the fibrous web comprising unoriented fibers to its one-phase coating is 70:30.

A self-sustaining porous thermosettable sheet material also having a basis weight of 0.045 lb./sq. ft. is produced in identical fashion utilizing fourteen denier oriented fibers. The previously described twenty-six denier unoriented filaments are subjected to a draw ratio of 1.6 to result in fourteen denier filaments having an axial orientation indicated by a birefringence value of 0.0238. The weight ratio of the fibrous web comprising oriented fibers to its one-phase coating is 70:30.

For purposes of comparison, the same reactants in identical proportions are formulated into a homogeneous one-phase "cast-type" thermosettable sheet material having a basis weight of 0.045 lb./sq. ft.

The self-sustaining porous thermosettable sheet materials are useful in metal-to-metal bonding. Each of the three adhesive configurations: the unoriented-fiber reactable web type, the oriented-fiber reactable web type, and the one-phase "cast-type," are respectively placed between two 4" x 7" x ¹⁄₁₆" aluminum plates in ½" overlap along the 7" dimension. The three overlap sandwich structures are each cured for one hour at 350° F. and 50 p.s.i., and then allowed to cool after withdrawal of the heat.

The adhesively bonded panels are then sawed into one-inch wide strips extending perpendicular to the bonded area. The strips were subjected to a steady longitudinal pull in accordance with ASTM–D1002, also described under MIL–A–5090D. Results expressed in pounds per square inch are as follows:

| Temperature °F. | "Cast-type" | Unoriented Fiber | Oriented Fiber |
|---|---|---|---|
| −67 | 5,190 | 5,850 | 5,800 |
| RT | 4,795 | 6,120 | 6,200 |
| 180 | 3,110 | 4,775 | 4,730 |
| 250 | 240 | 645 | 915 |
| 300 | 0 | 215 | 530 |

Example 2

This example relates ot a thermosettable adhesive composition comprising the following reactants:

| | Parts |
|---|---|
| Condensation polyamide of hexamethylene diamine and adipic acid | 95 |
| Polyisocyanate | 5 |

A porous thermosettable sheet material results when the condensation polyamide is employed as a fibrous web, the individual fibers of which are at least partially coated (but the web not flooded) with the polyisocyanate reactant. While a one-phase homogeneous mixture of the above composition provides a useful adhesive, the presence of the condensation polyamide reactant as a fibrous web separate and distinct from the coating of polyisocyanate on fibers thereof provides a product giving a much stronger thermoset bond per unit weight of adhesive composition.

The condensation polyamide of hexamethylene diamine and adipic acid is commercially available under the trade name "nylon 66." As thus obtained, it has a melting point of 482° F.

Five and one-half denier "nylon 66" polyamide oriented staple fiber having a melting point of 482° F. and a birefringence value of 0.060 is formed by means of a "Rando-Webber" felting machine into a non-woven fibrous web having a bias weight of 0.02 lb./sq. ft.

The polyisocyanate used is the reaction product of three mols tolylene diisocyanate with one mol trimethylol propane. It is commercially available as a 75% solution in ethyl acetate under the trade name "Mondur CB75." As thus obained, the 75% solution has a standard Gardner-Holt viscosity of 2100–4100 seconds and an isocyanate content of 12.5–13.5%. Twenty parts of "Mondur CB75" is dissolved in eighty parts acetone to provide a 15% solid solution consisting of:

| | Parts |
|---|---|
| Polyisocyanate | 15 |
| Ethyl acetate | 5 |
| Acetone | 80 |

The non-woven fibrous web is impregnated with the 15% solids solution and the solvents evaporated to provide a polyisocyanate coating about the individual fibers of the web. The resultant self-sustaining porous thermosettable sheet material has a basis weight of 0.0181 lb./sq. ft.; weight ratio of the fibrous web comprising oriented polyamide fibers to its polyisocyanate coating is 95:5.

For purposes of comparison, the same two reactants in the 95:5 ratio are formulated into one-phase "cast-type" thermosettable sheet material having a basis weight of 0.0181 lb./sq. ft.

Both adhesive configurations: the oriented-fiber reactable web type and the one-phase "cast-type" are respectively placed between two 4" x 7" x 1/16" aluminum plates in 1/2" overlap along the 7" dimension. The two overlap sandwich structures are each cured for 30 minutes at 500° F. and 50 p.s.i. They are allowed to cool to room temperature after withdrawal of the heat. One-inch wide specimens are tested for overlap sheer according to ASTM–D1002 procedures. Results expressed in pounds per square inch are as follows:

| Temperature °F. | "Cast-type" | Oriented Fiber |
|---|---|---|
| −67 | 1,775 | 3,160 |
| RT | 1,855 | 3,280 |
| 250 | 860 | 2,660 |
| 350 | 430 | 1,620 |
| 450 | 118 | 600 |

Thus the presence of the polyamide component as a reactable fibrous web provides a thermoset bond of significantly higher strength than if used along with the polyisocyanate reactant as a single phase mixture.

Example 3

This example relates to a polyreactant adhesive composition comprising the following reactants:

| | Parts |
|---|---|
| Polyamide resin | 2 |
| "ERLA 2774" epoxy resin | 1 |

A self-sustaining porous thermosettable adhesive sheet material of extremely high efficiency per weight basis results when the polyamide resin reactant is employed as a fibrous web, the individual fibers of which are at least partially coated (but the web not flooded) with the epoxy resin reactant. The use of oriented polyamide fibers provides a thermoset bond having especially high strength at temperatures above 180° F.

Five and one-half denier oriented filament of the polyamide resin, said filament having a birefringence orientation value within the range of 0.0387–0.0466 is given a crimp frequency of fifteen waves per lineal inch. The crimping operation is effected by means of a "Model CC Crimper (Sold by Turbo-Machine Co., Lansdale, Pa.) wherein the filament is forceably driven into a constant volume "stuffing box." The crimped fiber is then chopped into 1¼ to 1½ inch lengths to form a mass of staple fibers; these in turn are randomly interlaced by means of a "Rando-Webber" into a non-woven fibrous web having a basis weight of 0.030 lb./sq. ft. and a caliper of approximately 29 mils.

The polyamide resin used is an interpolyamide of: the condensation product of hexamethylene diamine with adipic acid, the condensation product of hexamethylene diamine with sebacic acid, and poly-epsiloncaprolactam; it is commercially available under the trade name "Zytel 61." "Zytel 61" polyamide resin has a Fisher-Johns melting point of 292° F. and a specific gravity of 1.12. It is soluble in lower alchools such as methyl alcohol and ethyl alcohol, and in some aqueous solutions of those, at approximately 80 parts alcohol to 20 parts water.

The non-woven fibrous polyamide web of 0.030 lb./sq. ft. basis weight after being made self-sustaining in the manner described in examples hereafter, is then impregnated with a solution consisting of:

| | Parts |
|---|---|
| "ERLA 2774" epoxy resin | 10 |
| 1,4 dioxane | 70 |

The dioxane solvent is evaporated to provide a self-sustaining porous thermosettable sheet material comprising a self-sustaining polyamide fibrous web, the individual fibers of which are at least partially coated by the epoxy resin. Basis weight of the thermosettable sheet material is 0.045 lb./sq. ft.; the weight ratio of the fibrous web to its epoxy resin coating is 2:1.

A similar thermosettable sheet material is produced in identical fashion by utilizing thirteen denier unoriented filament of the polyamide resin, said filament having a birefringence value of essentially zero. Basis weight of the thermosettable sheet material is likewise 0.045 lb./sq. ft.; the weight ratio of the fibrous web to its epoxy resin coating is 2:1.

The two porous thermosettable sheet materials, one comprising a reactable fibrous web of oriented polyamide fibers and the other comprising a reactable fibrous web of unoriented polyamide fibers, are respectively placed between two 4" x 7" x 1/16" aluminum plates in 1/2" overlap, and the two overlap sandwich structures are cured for one hour at 350° F. and 50 p.s.i. After cooling, a one-inch wide specimen of each is tested for overlap shear according to ASTM–D1002 procedures. Results expressed in pounds per square inch are as follows:

| Temperature °F. | Unoriented Fiber | Oriented Fiber |
|---|---|---|
| −67 | 6,420 | 6,700 |
| RT | 4,750 | 4,800 |
| 180 | 2,650 | 3,360 |
| 250 | 1,820 | 2,360 |
| 300 | 224 | 1,140 |
| 450 | 0 | 128 |

In the aeronautical industry, there is the continual never-ending quest for weight reduction without sacrifice of strength. Every weight reduction means a corresponding increase in pay-load capacity. Structural adhesive compositions must, of course, develop high resistance to both shear and peel forces through a wide temperature range. In addition, aeronautical structural adhesive compositions must be such as to heat-cure to the thermoset state at temperatures below about 350° F. This requirement is necessary because temperatures exceeding this value adversely affect the strength characteristics of the aluminum skin and underlying honeycomb frame.

Heretofore known aircraft srtuctural adhesives have been formed into homogeneous type films, with inert scrim type materials or carriers for the films. They have been placed between honeycomb frame and the outer skin (generally both being aluminum), and then heated under pressure in an autoclave so as to heat-cure the adhesive composition to provide a thermoset bond between the honeycomb frame and the outer skin. The required weight of this inert carrier type adhesive sheeting to provide an adequate thermoset bond when polyamide-epoxy adhesive compositions are employed should be at least about 0.06 lb./sq. ft. of aircraft skin surface.

It has now been found possible to effect a significant reduction in the amount of thermosettable sheet material necessary per square foot of aircraft skin surface through the use of a fibrous web comprising a polyamide reactant. The individual polyamide fibers thereof are at least partially coated with a one-phase mixture of the remaining reactants, the epoxy compound and preferably a cross-linking agent. It has further been found that the use of axially oriented polyamide fibers provides a thermoset bond having especially high strength at temperatures above 250° F. Only 0.04 lb./sq. ft. of the so constructed self-sustaining porous thermosetting sheet material will provide an adequate bond per square foot of aircraft skin surface. Thus, compared to the most efficient homogeneous one-phase "cast-type" sheet material of the prior art, at least about a 250-pound weight reduction is made possible in a DC-8 jet aircraft.

The greater efficiency per pound of adhesive sheeting is believed to result from at least three factors:

(1) The reactable fibrous web serves as its own carrier, thus rendering the use of an inert carrier (such as cotton gauze) unnecessary;

(2) The reactable fibrous web in porous condition provides a compressible adhesive sheet; compressibility provides better filleting between the aircraft skin and the underlying honeycomb frame than does the cast film construction of the prior art; and (3) The use of a fibrous reactant provides, as demonstrated by the previous examples, greater strength than does the same reactant in the amorphous plastic form.

Example 4

Specifically, this example relates to a self-sustaining porous thermosettable sheet material particularly suitable for aircraft production and comprising the following reactants:

| | Parts |
|---|---|
| Polyamide resin | 20.0 |
| "ERLA 0500" epoxy resin | 2.4 |
| "ERLA 2774" epoxy resin | 2.4 |

Weight ratio of the polyamide to the epoxy-dicyandiamide mixture is therefore 4:1. As illustrated, the cross-linking agent is preferably present in an amount stoichiometrically deficient for cross-linking the entire epoxy content. Indeed, as curing temperature is increased, bond strength has been noted to increase; and thus it has been possible to obtain high strength bonds of reacted material without special cross-linking agents for polyamide and epoxy resin combinations.

The polyamide resin used is the "Zytel 61," described in Example 3. Five and one-half denier oriented filament of the polyamide resin, said filament having a birefringence orientation value within the range of 0.0387–0.0466 is given a crimp frequency of fifteen waves per lineal inch. The crimped fiber is then chopped into 1¼ to 1½ inch lengths; these in turn are randomly interlaced by means of a "Rando-Webber" into a non-woven fibrous web having a basis weight of 0.032 lb./sq. ft. and a caliper of approximately 29 mils. The non-woven fibrous web is rendered autogenously self-sustaining by means of the technique described in Example 3.

Then, the self-sustaining fibrous polyamide web is impregnated with "Solution A" (described in Example 1) and dried to provide a self-sustaining porous thermosettable sheet material comprising a fibrous polyamide web, the individual fibers of which are at least partially coated by the one-phase residue of "Solution A." Basis weight of the resultant self-sustaining porous thermosettable sheet material is 0.040 lb./sq. ft.; the weight ratio of the fibrous polyamide web to its one-phase epoxy-dicyandiamide coating is approximately 4:1.

The sheet material is allowed to age for two months at 40° F. to simulate field storage conditions.

Held up to the light, the product, while clearly not transparent, exhibits a surprising degree of translucency and has a fabric feel or hand. It is porous as is readily demonstrated by placing it over one's mouth and blowing cigarette smoke through it.

In identical fashion, a fibrous web type thermosettable sheet material is made from thirteen denier unoriented polyamide resin filament having a birefringence value of essentially zero. Similarly, basis weight of the self-sustaining porous thermosettable sheet material is 0.040 lb./sq. ft.; the weight ratio of the fibrous polyamide web to its one-phase epoxy-dicyandiamide coating is approximately 4:1. It is allowed to age for two months at 40° F. to simulate field storage conditions.

For purposes of comparison, the same reactants are also formulated into a homogeneous one-phase "cast-type" thermosettable sheet material having an identical chemical composition and a basic weight 0.040 lb./sq. ft. The sheet material is similarly aged for two months at 40° F.

The three adhesive configurations: the cast-type, the oriented-fiber reactable web type, and the unoriented-fiber reactable web type, are respectively placed between two 4″ x 7″ x ⅟₁₆″ aluminum plates in ½″ overlap along the 7″ dimension, and the three overlap sandwich structures are each cured for one hour at 350° F. and 50 p.s.i. One inch wide specimens of each are tested for overlap shear as described in Examples 1–3.

Results expressed in pounds per square inch are as follows:

| Temperature, ° F. | "Cast-type" | Oriented Fibers | Unoriented Fibers |
|---|---|---|---|
| −67 | 7,400 | 7,390 | 6,920 |
| RT | 5,455 | 6,375 | 6,382 |
| 180 | 3,090 | 4,115 | 4,595 |
| 250 | 1,835 | 3,350 | 3,340 |
| 300 | 1,140 | 1,790 | 1,520 |
| 350 | 406 | 895 | 610 |

The three adhesive configurations are respectively placed between two 8″ x 8″ x ⅟₃₂″ aluminum plates in 6″ overlap, and the three overlap sandwich structures are each similarly cured for one hour at 350° F. and 50 p.s.i. After being allowed to cool, the adhesively bonded panels are then sawed into one-inch wide strips extending crosswise to the bonded area. "T-Peel" adhesion for the three adhesive configurations is tested by these one-inch wide overlap bonded specimens as follows. The unbonded ends are gripped in the jaws of a tensile tester and the aluminum plates are peeled apart at a 90° angle to the bond line (thus 180° in relation to each other) at a jaw separation rate of 20 inches per minute. Average peel values in pounds per inch width at various temperatures are as follows:

| Temperature, ° F. | "Cast-type" | Oriented Fibers | Unoriented Fibers |
|---|---|---|---|
| −67 | 20 | 18 | 12 |
| RT | 98 | 106 | 92 |
| 180 | 26 | 106 | 94 |
| 250 | 6 | 32 | 33 |
| 300 | 4 | 14 | 15 |

The three adhesive configurations are formed into sandwiches having eight-inch square clean aluminum honeycomb cores (¼″ cell, non-perforated ½″ thick 3003 aluminum alloy, 4 mil foil) and 8″ x 8″ x 0.020″ 2024 T3 clad aluminum plate are used as surfacing skins for each of the adhesive layers between which the core is bound, and the three sandwich structures are each cured for 1 hour at 350° F. and 50 p.s.i. After being allowed to cool, the adhesively bonded structures are then cut into 3″ x 8″ strips. These strips are tested for honeycomb peel, i.e., the amount of force necessary to pull the 3″ wide aluminum plate from the honeycomb core, in a tensile tester according to U.S. Government specification MIL–A–25463 (Para. 4.6.1–4.6.3). Peel value in lbs. are as follows:

| Temperature, ° F. | "Cast-type" | Oriented Fibers | Unoriented Fibers |
|---|---|---|---|
| −67 | (*) | (*) | (*) |
| RT | 68 | 170 | 190 |

*The aluminum honeycomb core fractures.

As is apparent non-woven webs of the thermosettable sheet material provide stronger thermoset adhesives than does the same adhesive composition employed as a homogeneous one-phase "cast-type" adhesive.

Example 5

A polyreactant adhesive composition was prepared from the following reactants:

| | Parts |
|---|---|
| 85:15 (mol ratio) vinyl chloride-vinyl acetate copolymer | 10 |
| Phenol-aldehyde resin | 7 |

The vinyl copolymer was a commercially available polymer marketed in fiber form as "Vinyon HH" (trade name of American Viscose Corp.). Five and one-half denier fibers of staple length of the "Vinyon HH" were formed on a Rando-Webber into a non-woven fibrous web having a weight of about 0.0172 lb. per square foot.

The phenol aldehyde resin was a liquid condensation product of 1 mol of a mixture of meta and para cresol with 0.5 to 2.0 mols of formaldehyde. The condensation product was composed of 81–85% solids by weight, had a specific gravity of 1.2837, and was formed in the presence of an alkaline catalyst. The reaction was carried to the point where the liquid was extremely viscous but still fluid, having a Brookfield viscosity of 5,000–20,000 cps., by carefully controlled heating under vacuum.

In the formation of the thermosettable fibrous web product, the non-woven fibrous web was impregnated with the phenolic resin and the remaining solvent evaporated to provide a 100% solids coating about the web fibers. The resultant self-sustaining porous thermosettable sheet material had a basis weight of 0.0292 lb. per sq. ft.

The same two reactants in the same ratio were also, with the aid of acetone solvent, formulated into a homogeneous cast thermosettable sheet material having a basis weight of 0.0292 lb. per sq. ft. so that the thermoset reaction products of both adhesive forms could be compared.

Then, each of these adhesive materials, of the same weight and thickness, was placed between two 4 inch by 7" x 1/16" thick aluminum plates overlapped 1/2" along the 7" dimension. The overlap sandwich structures so created were then each cured for 60 minutes at 350° F. and 50 p.s.i. with a heat rise per minute of approximately 10° F. Both of the overlapped sandwich structures with the thermoset adhesive were then allowed to cool to room temperature. One inch wide specimens were then tested for overlap shear in accordance with ASTM–D1002 procedure. The results expressed in lbs. per sq. inch are as follows:

| Temperature, °F. | Cast Film | Fibrous Web |
|---|---|---|
| −67 | 3,120 | 4,125 |
| RT | 2,740 | 4,600 |
| 180 | 1,812 | 1,810 |

From this data it is apparent that the presence of the vinyl copolymer in fiber form as opposed to its presence in a cast film form provides thermoset bonds of significantly higher strength.

Example 6

The use of low melting polyamide fibers such as those of "Zytel 61" has resulted in the formation of new and unusual non-woven webs and papers of these fibers, alone, and with a wide variety of coordinate fibers.

Thus, it has been found that the crimped "Zytel 61" fibers of Example 3 do not form a self-sustaining non-woven web on the Rando-Webber.

This non-woven fibrous web, as is typical with polyamide non-woven webs, is of soft texture but of insufficient strength to be self-sustaining. Conventional heat and solvent techniques to fuse the fibers together at their mutual cross-over points to thereby strengthen the web have been unsuccessful. Fusion heat will distort the polyamide fiber cross-sectionally and contract it linearly, thus causing a shrinkage and hardening of the non-woven structure. Solvents and solvent-diluent mixtures have similar harmful effects.

However, it has been surprisingly found that immersion of the polyamide non-woven fibrous web into warm water (having a temperature in the neighborhood of 100° F.) activates the fiber surfaces, apparently by solvent softening of the surface of the fibers by the warm water, without disturbing the cross-sectional or linear dimensions thereof. Moderate pressure applied upon the web fuses the surface-activated fibers together at their mutual cross-over points. Evaporation of the water at temperatures below about 200° F. results in an autogenously bonded self-sustaining non-woven fibrous web yet retaining its original dimensions and soft texture. Microscopic examination of the polyamide fibers reveals that the original cross-sectional shape and dimensions thereof remain essentially unchanged.

Alternatively, an identical self-sustaining non-woven polyamide fibrous structure may be formed from a polyamide fiber-warm water slurry utilizing conventional paper-making equipment, as for example, a Fourdrinier machine. Interesting non-woven bats and papers, wherein the polyamide fiber is used in conjunction with certain other coordinate fibers, fibrids, and pulps, have been produced respectively on a Rando-Webber machine and on conventional paper-making equipment. An illustrative, though non-exclusive list of coordinate materials is as follows: cellulosic pulp, wool, glass fibers, asbestos, rayon fibers, aluminum fibers, carbon fibers, highly fibrillated polymer fibers of dimethyl terephthalate and ethylene glycol, and fibrillated fibers of condensation polyamides of hexamethylene diamine and adipic acid. The hydrophilic smooth-surfaced interpolyamide fiber, along with the desired coordinate material, is preferably made into a slurry with 100° F. water and deposited onto a paper-making screen. While the screen-deposited web is still warm and moist, moderate pressure is applied to cause the surface-activated interpolyamide fibers to fuse both with like interpolyamide fibers and with the coordinate materials at their mutual cross-over contact points to result in an autogenously bonded self-sustaining non-woven fibrous web.

Example 7

The relation of the rate of heat rise to the final properties of the adhesive is apparent from the table following.

A self-sustaining epoxy impregnated porous thermosettable web was made in accordance with Example 4; the web had a weight of 0.040 lb. per sq. ft. Identical portions of this web were placed between 4" x 7" x 1/16" aluminum plates with 1/2" overlap along the 7" dimension and the sandwiches so formed were all cured at 350° F. and 50 p.s.i. for one hour. But, the heat rise per minute from room temperature to the curing temperature was varied from 1° F. per minute to 10° F. per minute. The samples were then tested in overlap shear in accordance with the procedures previously described. The results are noted below.

| Heat Rise to 350° F./min. | Overlap Shear, p.s.i. | | |
|---|---|---|---|
| | −67° F. | 75° F. | 180° F. |
| 1 | 5,760 | 5,310 | 3,540 |
| 2 | 6,970 | 5,985 | 4,260 |
| 3 | *7,690 | 6,000 | 4,350 |
| 5 | *7,470 | 6,330 | 4,200 |
| 10 | 6,940 | 5,705 | 3,320 |

*Aluminum broke.

With a cast film of the same adhesive but somewhat heavier having a weight of .055 lb. per sq. ft. the best values obtained in the overlap shear test were as follows.

Overlap shear, p.s.i.:
−67° F. ---------------------------------- 6300
75° F. ---------------------------------- 5700
180° F. ---------------------------------- 3600

From the foregoing it is apparent that a heat rise on the order of at least about 2° F. per minute to curing temperature is desirable to obtain the advantages provided by this invention. With this particular system maximum benefits resulted in a temperature rise rate of 2 to 5° F. per minute. While the cast film appears to provide results comparable to those achieved by the 10° F. per minute heat rise of the adhesive web, it is to be noted that 25% more weight of cast film adhesive was used to cover the same area.

This invention provides an extremely practical route to the formation of thermoset plastics having fibrous reinforcing properties contributed by the thermosetting reactants themselves. Thus, in the molding of structural parts and in other areas of plastic technology, in addition to structural adhesives, the reinforcing properties provided by this invention may be used as a supplement to or in lieu of other reinforcing to make better and stronger thermoset plastic products.

What is claimed is as follows:

1. A self-sustaining thermosettable sheet material consisting essentially of a cohesive web of thermoplastic fibers having latently reactive sites and a non-fibrous organic resin reactive with said latently reactive sites at a temperature above the melting point of said fibers and below the decomposition temperature of the resultant thermoset sheet material, the thermoplastic fibers being in stoichiometric excess to said reactive organic resin, said excess being in the range of from about 1.1:1 to 15:1 whereby as the sheet material is heated to thermoset, thermosetting is achieved before complete fiber melting whereby the resultant thermoset sheet material retains vestigial fiber reinforcement after the thermosetting.

2. The sheet material of claim 1 wherein said thermoplastic fibers are of a methanol soluble nylon and said organic resin is an epoxy resin, said sheet material further including an oxirane reactive cross-linking agent.

3. A self-sustaining porous sheet of a thermosettable adhesive composition comprising: a methanol-soluble hydrophilic polyamide resin, an epoxy resin reactive with said polyamide resin, and dicyandiamide, said methanol-soluble resin being present as a self-sustaining fibrous web, the individual fibers of said web being at least partially surrounded by a coating comprising said epoxy resin and dicyandiamide, said polyamide resin being in stoichiometric excess to said epoxy resin, the dicyandiamide being present in an amount stoichiometrically deficient for cross-linking the entire epoxy content.

4. A thermosetting composition comprising in intimate contact with one another (1) a plurality of contiguous, axially oriented, methanol soluble, nylon fibers having a melting temperature of less than about 300° F., and (2) an epoxy composition reactive therewith at a temperature above the melting point of said fibers to form a thermoset product having fibrous reinforcing properties contributed by said fibers, said nylon fibers being in stoichiometric excess to said epoxy composition in the range of from about 1.1:1 to 15:1.

5. A method for making a thermoset reaction product having fibrous reinforcing properties contributed by one of the thermosetting reactants, said method comprising reacting (1) a stoichiometric excess of a plurality of contiguous, flexible, highly crystalline thermoplastic polymer fibers having latently reactive sites with (2) an organic material reactive with said fibers at a temperature above the melting point and below the decomposition temperature of the fibers, the reaction being carried out by maintaining (1) and (2) in reactive contact with one another while heating to the reaction temperature at which said melting fibers and organic material react to form said thermoset product, and maintaining said reaction temperature for a time sufficient to complete the thermosetting reaction.

6. A method for making a thermoset reaction product having fibrous reinforcing properties contributed by one of the thermosetting reactants, said method comprising reacting (1) a stoichiometric excess of a plurality of contiguous, flexible, highly crystalline nylon fibers having latently reactive sites with (2) an epoxy compound reactive with said fibers at a temperature above the melting point and below the decomposition temperature of the fibers, the reaction being carried out by maintaining (1) and (2) in reactive contact with one another while heating to the reaction temperature at which said melting fibers and epoxy compound react to form said thermoset product, and maintaining said reaction temperature for a time sufficient to complete the thermosetting reaction.

7. A method for making a thermoset reaction product having fibrous reinforcing properties contributed by one of the thermosetting reactants, said method comprising reacting (1) a stoichiometric excess of a plurality of contiguous, flexible, highly crystalline methanol soluble nylon fibers having a melting point no higher than about 300° F., having latently reactive sites with (2) an epoxy compound reactive with said fibers at a temperature above the melting point and below the decomposition temperature of the fibers, the reaction being carried out by maintaining (1) and (2) in reactive contact with one another while heating at a rate of heat rise of at least about 2° F. per minute to a reaction temperature of 300–350° F. whereupon said melting fibers and epoxy compound react to form said thermoset product, and maintaining said reaction temperature for a time sufficient to complete the thermosetting reaction.

8. The method of autogenously bonding a nonwoven fibrous web comprising a heterogeneous mixture of methanol-soluble hydrophilic interpolyamide fibers and at least one fibrous coordinate material while maintaining the original length and cross-sectional shape of said methanol-soluble hydrophilic interpolyamide fibers, said method comprising: pressing together in porous sheet material form the randomly interlaced hydrophilic interpolyamide fibers in the presence of water having a sufficiently high temperature to surface activate though insufficient to internally soften the hydrophilic interpolyamide fibers, and drying the water at a temperature below the softening point of said hydrophilic interpolyamide fibers.

References Cited

UNITED STATES PATENTS

| | | | |
|---|---|---|---|
| 2,252,554 | 8/1941 | Carothers. | |
| 2,869,973 | 1/1959 | Hubbard et al. | 161—169 |
| 3,214,324 | 10/1965 | Peerman | 117—161 |
| 2,336,797 | 12/1943 | Maxwell | 161—150 |
| 2,774,128 | 12/1956 | Secrist | 161—150 |

FOREIGN PATENTS 556,905  5/1958  Canada.

ROBERT F. BURNETT, *Primary Examiner.*

L. M. CARLIN, *Assistant Examiner.*

UNITED STATES PATENT OFFICE
CERTIFICATE OF CORRECTION

Patent No. 3,409,497  Dated November 5, 1968

Inventor(s) Luther M. Roseland

It is certified that error appears in the above-identified patent and that said Letters Patent are hereby corrected as shown below:

Column 1, line 33, "or inert" should read -- on inert --.

Column 4, line 35, "90%" should read -- 95% --.

Column 6, line 27, "are" should read -- were --; line 68, "bias" should read -- basis --; line 68, "0.02 lb./sq.ft." should read -- 0.0172 lb./sq.ft. --.

Column 8, line 43, "450" should read -- 350 --.

Column 9, line 3, "thermosetting" should read -- thermosettable --; line 33, the fourth item to table was omitted and the following should be added:
-- Dicyandiamide cross-linking agent    0.2 --.

Column 10, line 8, "basic" should read -- basis --.

SIGNED AND
SEALED
MAY 26 1970

(SEAL)
Attest:

Edward M. Fletcher, Jr.
Attesting Officer

WILLIAM E. SCHUYLER, JR.
Commissioner of Patents